US007963422B2

(12) United States Patent
Ramnarine

(10) Patent No.: US 7,963,422 B2
(45) Date of Patent: Jun. 21, 2011

(54) DOUBLE-ACTION FLUID WEIGHING AND DISPENSING PROCESS AND SYSTEM

(75) Inventor: Reynold Ramnarine, Wellington, FL (US)

(73) Assignee: W. R. Grace & Co.-Conn., Columbia, MD (US)

( * ) Notice: Subject to any disclaimer, the term of this patent is extended or adjusted under 35 U.S.C. 154(b) by 892 days.

(21) Appl. No.: 11/782,767

(22) Filed: Jul. 25, 2007

(65) Prior Publication Data

US 2009/0026220 A1     Jan. 29, 2009

(51) Int. Cl.
*B67B 7/00* (2006.01)
*B67D 7/14* (2010.01)

(52) U.S. Cl. ............... 222/1; 222/55; 222/77; 222/334

(58) Field of Classification Search ............ 222/55, 222/77, 334, 1
See application file for complete search history.

(56) References Cited

U.S. PATENT DOCUMENTS

| | | | | |
|---|---|---|---|---|
| 2,287,829 A * | 6/1942 | Bryan | ............. | 222/77 |
| 3,756,456 A | 9/1973 | Georgi | | |
| 4,010,769 A | 3/1977 | De Lorenzo et al. | | |
| 4,188,978 A | 2/1980 | De Lorenzo | | |
| 4,320,855 A * | 3/1982 | Ricciardi et al. | ............. | 222/56 |
| 4,475,665 A * | 10/1984 | Norton | ............. | 222/14 |
| 4,519,753 A | 5/1985 | Kitsnik | | |
| 4,830,230 A * | 5/1989 | Powers | ............. | 222/334 |
| 5,038,973 A * | 8/1991 | Gmur | ............. | 222/56 |
| 5,224,626 A | 7/1993 | Hernandez | | |
| 5,224,627 A | 7/1993 | Weag | | |
| 5,377,868 A | 1/1995 | Hernandez et al. | | |
| 5,713,486 A * | 2/1998 | Beech | ............. | 222/1 |
| 6,224,250 B1 | 5/2001 | Kreinheder et al. | | |
| 6,541,063 B1 | 4/2003 | Prentice et al. | | |
| 6,814,810 B2 | 11/2004 | Prentice et al. | | |
| 2005/0232797 A1 * | 10/2005 | Riney | ............. | 417/511 |
| 2006/0207316 A1 | 9/2006 | Tyrell | | |

OTHER PUBLICATIONS

Plast-O-Matic Valves, Inc., "Air-Operated Chemical Metering Pumps", http://www.plastomatic.com/vpa.html, printed Jul. 11, 2007, 6 pages.
Plast-O-Matic Valves, Inc., "'Plast-O-Matic' Chemical Metering Pumps Are Explosion-Proof and Self-Priming. They Are Designed to Deliver Exact Quantities of Highly Corrosive or Ultra-Pure Liquids Such As Sulphuric Acid, Hydrochloric Acid, Chlorine, Caustics, and Demineralized Water", Jul. 11, 2007, 3 pages.
Plast-O-Matic Valves, Inc., "Series 'VPA' Air Operated Filling and Metering Pumps Installation Instructions", dated Jan. 2006, 2 pages.
Plast-O-Matic Valves, Inc., "Plast-O-Matic VPA Metering Pump—A Case History", printed Jul. 11, 2007, 2 pages.
Form PCT/ISA/210 and 237, International Search Report and Written Opinion for PCT/US2008/070161 dated Oct. 8, 2008, 8 pages.

* cited by examiner

*Primary Examiner* — Kevin P Shaver
*Assistant Examiner* — Daniel R Shearer
(74) *Attorney, Agent, or Firm* — Craig K. Leon; Stephan P. Williams

(57) ABSTRACT

Apparatus and process for dispensing fluids, such as chemical concrete admixtures, using an air-operated pump and load cell for supporting and measuring at least substantially 100% of the weight of the pump and fluid dispensed through the pump. A double-action, dual piston design of the air-operated pump allows positive air pressure to be used during both fluid-filling and fluid-expelling phases.

13 Claims, 1 Drawing Sheet

DOUBLE-ACTION FLUID WEIGHING AND DISPENSING PROCESS AND SYSTEM

FIELD OF THE INVENTION

The present invention relates to dispensing of fluids, and more particularly to a novel apparatus and process for weight-based dispensing of fluid concrete admixtures, as well as other fluids.

BACKGROUND OF THE INVENTION

Equipment for dispensing chemical additives and admixtures into concrete is conventionally based on volumetric measurement. Such equipment includes mechanical fluid meters, sight bottles as visual indicators, control elements, bladder tanks, tubing, valves and pumps. Volumetric systems require consideration of the viscosity of the various fluids to be dispensed, and the viscosity can vary considerably depending on temperature and other factors.

Mechanical fluid meters are often problematic due to their moving parts and due to the effects of chemical attack on the numerous parts. Sight bottles are typically constructed out of steel or acrylic, and are calibrated. The sight bottles need to be located at or near the concrete batching office or otherwise monitored closely by visual means. This usually requires that extensive tubing be run from the dispensing location to the batching office. Throughout the concrete ready-mix industry, the various components of concrete such as cement, sand, aggregates, and water are weighed to determine the proper amount for batching, and hence volumetric dispensing of admixtures presents an additional procedural step, for which additional hardware and personnel training is required.

In U.S. Pat. Nos. 5,224,626 and 5,377,868 (owned by the assignee hereof), Hernandez et al. taught an apparatus and method for dispensing admixtures based upon weight so as to avoid the additional procedural step of measuring volumetrically. In one embodiment of this dispensing system, one or more admixture storage containers are supported by a suspended platform. In another embodiment, brackets are used for suspending the containers. A weight sensing system such as a single load cell is used for weighing the contents of the admixture storage containers. The platform or brackets are arranged so that the load cell is responsive to less than 100% of the weight in the containers. The containers are filled to a predetermined weight, and the contents are dispensed from each container in series or simultaneously. The weight sensing system of Hernandez et al., however, has not been commercially adopted in the ready-mix industry, which continues to employ volumetric measurement as a predominant practice.

It is therefore among the objectives of the present invention to provide a novel apparatus and process for dispensing concrete admixtures or other dispensable fluids, with enhanced accuracy, reliability, durability, cost-effectiveness, convenience in installation, and serviceability.

It is a further objective to provide an apparatus and processes for dispensing fluids of varying viscosities. The invention may be used to dispense paints and pigments, particle suspensions, fiber suspensions, and other fluids that may have extremely high viscosities, such as gels and pastes, and even gels and pastes having suspended particles, fibers, or other materials.

SUMMARY OF THE INVENTION

In surmounting the disadvantages of prior art volumetric fluid dispensing systems, the present invention employs an air-operated dispensing pump apparatus and achieves high accuracy measurement by weighing substantially 100% of the pump apparatus and fluid actually dispensed by the pump apparatus.

The invention eliminates the need for external mechanical pumps, metering devices, liquid sensing probes, or admixture filters, which are problematic parts used currently in the concrete ready-mix industry.

The invention can be used for dispensing various kinds of fluids, including paints, gels, pastes, and fluids of varying viscosities and materials, such as particulate and/or fiber suspensions.

In its broadest form, the present invention combines a positive-displacement piston pump, which is typically used for volumetric measurement of fluids, with a load cell for measuring weight of the pump and, hence, of weight of fluids dispensed through the pump. An exemplary fluid dispensing apparatus of the invention thus comprises: (A) a positive-displacement piston pump apparatus; and (B) a load cell connected to the pump apparatus for measuring the weight of the pump apparatus and fluids pumped by the pump apparatus.

In further exemplary embodiments, the fluid dispensing apparatus comprises: (A) an air-operated pump comprising first and second pistons each slidably housed within corresponding first and second piston sleeve housings; a shaft member for connecting the pistons; at least one barrier member located between the housings and conformed to permit reciprocating sliding of the shaft member while minimizing air leakage between housings; the first piston sleeve housing having at least one opening for filling and/or expelling a fluid from its housing; the second piston sleeve housing having a first opening located to admit pressurized air to exert positive force on a first face of the second piston to slidably move the second piston from a first position to a second position within its housing, the housing having a second opening located to admit pressurized air to exert a positive force on a second face of the second piston to slidably move it from a second position to a first position within its housing, whereby the positive force of air-pressure is transmitted to the first piston for filling fluid into and dispensing fluid from said first piston sleeve housing; and (B) a load cell for supporting and measuring at least substantially 100% of the weight of the air-operated pump and fluid contained in the first piston sleeve housing.

The phrase "at least substantially 100%" means the ability of the present invention to measure the weight of the pump apparatus as well as peripheral accessories, such as flexible hoses, clamps, brackets or other devices used for connecting the pump to the load cell, wires, etc. The amount of fluid dispensed by the system is determined by subtracting the weight of the pump when empty from the weight of the pump and fluid (in pump).

By using conjoined pistons, the present invention employs as few moving parts as possible in a "double-action" drive design. Positive air pressure forces both sides of the second (air) piston to exert corresponding force on the first (fluid) piston so that it can reciprocate back and forth between filling and expelling positions. This means that relatively flexible tubing can be used to connect a pressurized air source for driving both sides of the air piston. This use of double-action positive pressure is superior to using a vacuum to generate suction because a rigid pipe would be otherwise be required for resisting collapse due to negative air pressure; and the load-bearing nature of the rigid pipe would introduce inaccuracies in measuring the weight of the pump apparatus using the load cell.

The use of a positive displacement pump, while typically used for volumetric metering of dispensed fluids, is cleverly combined with a load cell, which is a gravimetric means for measuring the amount of fluid dispensed. Greater accuracy is provided thereby. If air is pulled into the fluid chamber of the pump, this would not create significant error in measuring the amount of fluid being dispensed, because the amount of fluid dispensed is determined gravimetrically, not volumetrically; and the weight of air in the fluid chamber would likely be insignificant compared to the total weight of the fluid dispensed from the pump.

In exemplary devices and processes of the invention, the weight of the fluid dispensed is the increased weight above the tare weight, which is the weight of the empty pump, filled hoses, and fittings and other attachments.

In preferred embodiments, a four-way air valve directs pressurized air against one side of the air piston and exhausts air from the other side, thereby driving the fluid piston towards a filling position. The load cell sends a signal to an inputs processing device (IPD) connected to a computer processing unit (CPU). The CPU directs the IPD to switch the four-way air valve when the desired amount of fluid is filled into the fluid chamber, and the fluid piston can then be sent into an expelling position to dispense the fluid. The CPU can be programmed such that this process is repeated until the total desired fluid amount is dispensed.

Further advantages and features of the apparatus and process of the present invention are explained in further detail hereinafter.

BRIEF DESCRIPTION OF THE DRAWING

The following detailed description of exemplary embodiments may be more readily appreciated when read in conjunction with the appended drawing, wherein.

DETAILED DESCRIPTION OF EXEMPLARY EMBODIMENTS

Figure 1:
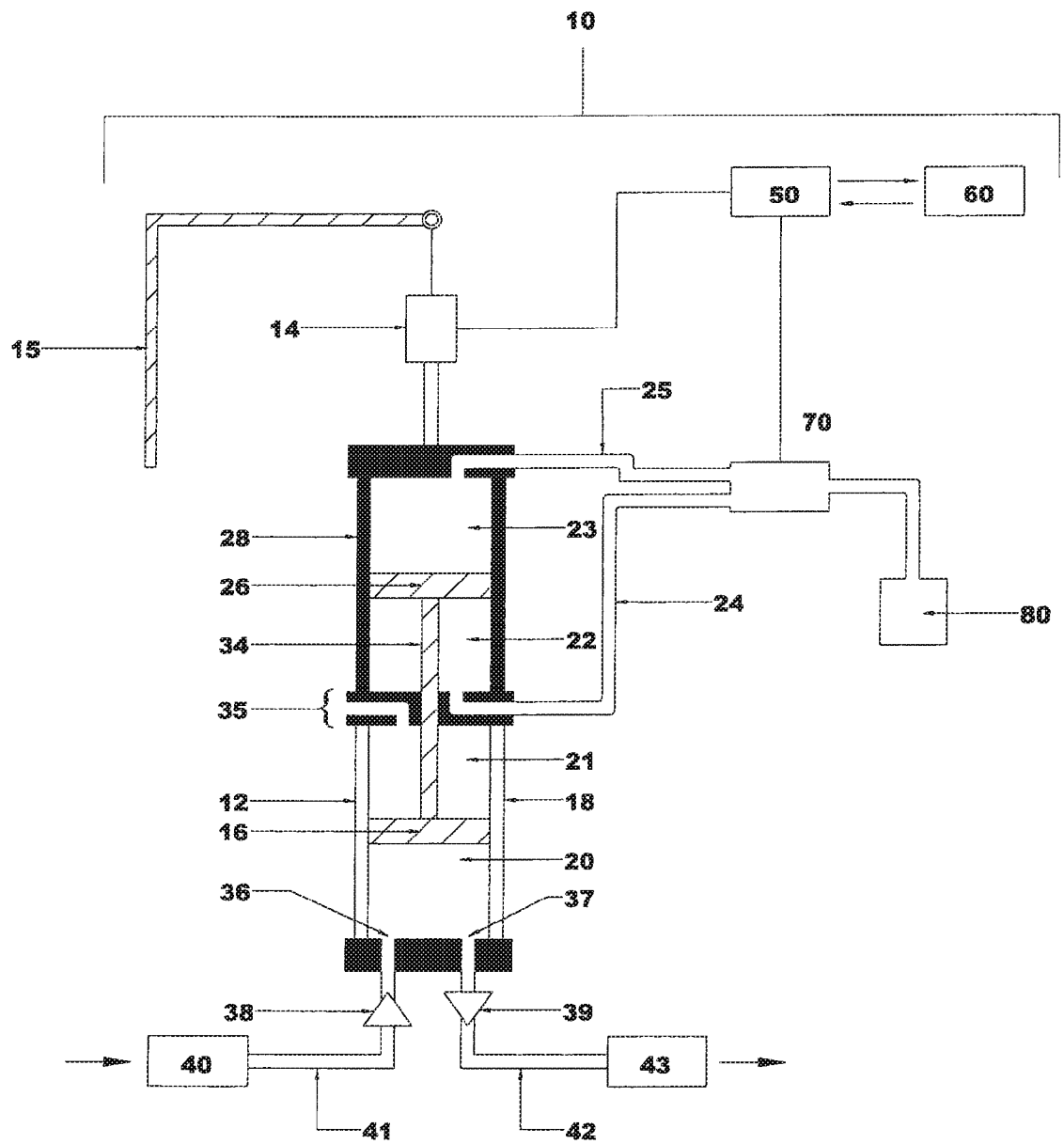
FIG. 1 is a plan diagram of an exemplary apparatus and process of the present invention for dispensing a fluid.

As shown in FIG. 1, an exemplary fluid-dispensing apparatus 10 and process of the present invention comprises an air-operated pump 12 having at least one piston 16 that is slidably housed within a piston sleeve housing 18, a fluid chamber 20 defined within the piston sleeve housing 18 for admitting and expelling a fluid (as designated at 40), and a load cell 14 for supporting and measuring substantially at least 100% of the weight of the pump 12 and fluid contained within the fluid chamber 20 of the pump 12. Flexible tubing (as designated at 24, 25, 41, and 42) connects the pump 12 components (as designated at 40, 50, 70, and 43 and described hereinafter) whose weights are preferably not supported by the load cell 14.

The piston sleeve housing material, including the sleeve walls, end caps or barriers, may comprise known materials depending on the nature of the fluids 40 or chemicals to be dispensed. Such materials may include those typically used for fluid pumps, such as polyvinylchloride (PVC), acrylic, stainless steel, glass, or other materials.

It is understood that one or more annular seal rings (not shown) may be used around the circumference of the first piston 16 to permit sliding movement of the piston 16 within the first piston sleeve housing 18, while minimizing leakage of fluids contained within the fluid chamber 20 defined by the first piston sleeve housing, first piston 16, and end cap. The piston and sleeve housing thus operate in a manner resembling a hypodermic syringe. Annular seal rings, which may be optionally used around the circumference of the piston 16, may be made of materials conventionally used in piston pumps, such as elastomers (e.g., nitrile rubber, fluorocarbon rubber, ethylenepropylenediene monomer (EPDM) rubber, etc.) and synthetic polymers (e.g., polytetrafluoroethylene or "PTFE"), depending on the chemical or physical nature of the fluid being dispensed.

The load cell 14 may be mounted in any manner so as to support the weight of the pump 12. For example, the load cell 14, which is preferably a suspension type load cell, may be attached mechanically to a ceiling (not shown), beam, or frame device (designated as at 15) that may be fastened to the floor, ceiling, wall, or fixture. The frame device 15 may be self-supporting in that it can have two or more vertical legs (only one leg is partially illustrated at 15 for sake of simplicity), preferably reaching all the way to the ground. It is preferable, however, to hang the pump 12 from the load cell 14 rather than to support the pump 12 on top of the load cell 14, because this increases accuracy for weight measurement and increases longevity of any sealing rings used around the piston 16 in sealing the fluid chamber 20.

The load cell 14 is a force transducer device that converts force or weight into an electrical signal. In most cases, the load cell 14 decreases or enhances an electrical signal sent through it, so that the signal corresponds to the weight placed on the load cell. Such load cells employ a strain gage that changes resistance when stressed. These consist of fine wires cemented to the surface of a beam, ring, or column (the strain element) within the load cell. As the surface to which the gage is attached becomes strained, the wires stretch or compress thereby changing resistance proportional to applied load. One or more strain gages can be used in a load cell.

The load cell 14 of FIG. 1 is preferably used to suspend substantially 100% of the weight of the air-operated fluid-dispensing pump 12 and any fluid contained within the fluid chamber 20. The load cell 14 may be electrically connected to an electric metering device, such that the weight of the pump, with and without fluid, can be monitored and measured. The load cell 14 may be an "S" type strain gage, for example, having a shape for convenient hanging or suspending the pump 12. Load cell capacity will vary depending on the size of the pump and amount of fluid to be dispensed, and this would be a matter of design preference.

The exemplary air-operated pump 12 shown in FIG. 1 comprises a first piston 16 slidably housed within a first piston sleeve housing 18 thereby defining a fluid chamber 20 on one side of the first piston 16 and a second chamber 21 on the other side of the piston 16. Preferably, the second chamber 21 is vented to permit air to escape from the sleeve housing 18 when the first piston 16 is in a refill-stroke and is pulling fluid into the fluid chamber 20. The exemplary pump 12 further comprises a second piston 26 slidably housed within a second piston sleeve housing 28 thereby defining a refill stroke air chamber 22 on one side of the second piston 26 and a discharge stroke air chamber 23 on the other side of the second piston 26. The second piston may optionally have one or more annular seal rings (not shown) around its circumference similar to the first piston 16 described above.

A shaft member 34 connects first piston 16 to second piston 26 and coordinates piston movement within respective sleeve housings 18 and 28. A barrier member 35 separates the housings 18 and 28, and contains a passageway conformed to permit reciprocating motion therethrough of shaft member 34, between refill and discharge positions, while minimizing air leakage between piston sleeve housings 18 and 28.

The first piston sleeve housing 18 has at least one opening for admitting and/or expelling a dispensable fluid from the housing 18. Preferably, the housing 18 has a first opening 36 for refilling a dispensable fluid into the chamber 20 and second opening 37 for discharging the fluid from the chamber 20. As shown in FIG. 1, an inlet check valve 38 is located at or adjacent the inlet opening 36 to permit fluid to flow in one direction into the chamber 18 during a refilling cycle while resisting backflow during a discharge cycle, while an outlet check valve 39 is located at or adjacent the outlet opening 37 to permit fluid to flow in one direction out of the chamber 20 during a discharge cycle while resisting backflow during a refilling cycle.

In an alternative embodiment, the first piston sleeve housing 18 may have one fluid chamber 20 opening and a "T" shaped pipe or other three-way conduit (not illustrated) for connecting the fluid chamber 20 with inlet 38 and outline 39 check valves or with tubing connected to the valves 38/39.

Conventional one-way valve devices may be employed for the inlet check valve 38 and outlet check valve 39. For example, U.S. Pat. No. 4,188,978 of De Lorenzo discloses a valve mechanism having an internal diaphragm that flexes and exposes openings through which a fluid may flow when pressuring the diaphragm in one direction, but the diaphragm openings close due to pressure on the diaphragm from the opposite direction.

A double-piston chemical pump is commercially available from Plast-O-Matic Valves, Inc., of Cedar Grove, N.J., and is believed to be suitable, with little or no modification required, for purposes of the present invention. Such pumps, with bodies, shaft, piston assemblies, and cylinder walls can constructed of GEON® brand type 1, grade 1 PVC (polyvinylchloride), as well as of polypropylene, Kynar® brand polyvinylidenechloride (PVDC), PTFE, and stainless steel. These pumps are designed specifically for volumetric applications, in which precise volume quantities of fluid are to be metered with accuracy in terms of discharge repeatability of 0.05%. These pumps come with a locking nut and adjusting bolt located at one end of the piston cylinder housing to control the extent of piston movement (and thus to control maximum volume quantity), but this bolt is not necessary for the weight-dependent concept of the present invention. Thus, it is advisable to adjust this bolt so that maximum volume can be used or otherwise to use this bolt to hang the cylinder body of the pump onto the load cell 14 of the present invention, as shown in FIG. 1.

The exemplary pump 12 of FIG. 1 is illustrated having four (4) chambers, two air chambers (described hereinabove as refill stroke air chamber 22 and a discharge stroke air chamber 23), a fluid chamber 20, and an auxiliary refill stroke air chamber 21 on the opposite side of first (fluid-pumping) piston 16. Movement within the chambers is controlled by the reciprocating action of the shaft and piston assembly (34/16/26). A four-way air valve 70, which is preferably an electro-pneumatic valve design (solenoid operated), is connected to a source of pressurized air 80 and alternatively introduces and exhausts air pressure on both sides of the second piston 26 within the second piston sleeve housing 28, and this causes the first piston 16 to reciprocate to refill fluid into or expel it from the fluid chamber 20. Thus, the four-way air valve 70 will feed pressurized air into the refill chamber 22 while exhausting air from the expelling chamber 23, and then switch to exhausting air from the refill chamber 22 while feeding pressurized air into the expelling chamber 23, and so on, until the desired total volume of fluid is dispensed through the fluid chamber 20. The four-way air valve 70 may use any number of known designs. For example, the valve 70 may have a rotary design, or a sliding design similar to a trumpet valve, for alternatively connecting one of the refill chamber 22 or the expelling chamber 23 to the pressurized air source 80, and venting exhausting air from the other of these chambers to the outside atmosphere. The use of a compressed air tank device 80 is better than using a motorized pump directly connected to the pump 12, because this enhances accuracy for load cell 14 readings and smoother operation of the fluid-dispensing apparatus 10 as a whole.

The auxiliary air chamber 21 located on the face of the first piston 16 opposite the fluid chamber 20 may be either vented, as shown by using an opening in the barrier 35. More preferably, the auxiliary air chamber 21 is sealed to create positive air-pressure build-up on the refill stroke so as to prevent fluid from leaking around the first piston 16 from the fluid chamber 20 into the auxiliary air chamber 21. Alternatively, an opening in the barrier 35 can be connected to the same pressured air source that feeds hose 25 so that the first piston 16 as well as the second piston 26 can be driven by pressurized air on the fluid expelling cycle.

In the exemplary embodiment of FIG. 1, the four-way air valve 70 receives its on-off electrical signal from an electrical switching device (designated at 50), which is part of an inputs and outputs processing device (also designated for the sake of convenience at 50) for receiving electrical signals, such as millivolt pulses, from the load cell 14 corresponding to weight on the load cell 14. The inputs processing component of the device designated at 50 is electrically connected to a computer processing unit 60 (hereinafter "CPU") which receives signals from the outputs processing component of the device (60) and relays the millivolt signals from the load cell 14 or otherwise converts them into 110 volt electrical pulses, corresponding to the weight suspended from the load cell 14. The CPU functions to correlate the received signals to measure the weight of at least substantially 100% of the entire pump 12, both in an empty state and in a state wherein it is filled with fluid contained in the fluid chamber 20, thus determining the amount of fluid being dispensed from the fluid chamber 20. Consequently, the CPU can be programmed to send appropriate electrical signals to the inputs and outputs processing device(s) 50 to operate the four-way air valve 70, which in turn refills and discharges the pump apparatus 12 until the sufficient amount of fluid, in terms of weight sensed by the load cell 14, is dispensed by the system through the fluid chamber 20.

Flexible tubing or hoses 24/25, which can be made of rubber or other elastomers, or polymers such as PVC, may be used for feeding pressurized air from the four-way air valve 70 to the air chambers (22 and 23). Such materials may also be used for tubing 41 for feeding fluid from a storage container 40 or barrel into the fluid chamber 20 of the pump 12, as well as for the tubing 42 that is used for dispensing fluid being expelled from the fluid chamber 20 of the pump 12. The fluid may be dispensed into a further container 43, vehicle (e.g., mixing truck), or other receptacle. For example, the fluid may be dispensed into a mixer, which may contain wet cement paste, mortar, or concrete.

It should be evident to those of skill in the art that the tubing, hoses, and electrical wires used for connecting the air-operated piston pump 12 to the various other components (e.g., fluid reservoir 40, inputs and outputs processing device 50, and four-way air valve 70, etc.) should be selected and arranged in spatial orientation, such that they do not interfere with accurate measurement by the load cell 14 at moments when the pump is empty of fluid and when it otherwise contains fluid to be dispensed. Preferably, the pump 12 containing the dual pistons 16 and 26 (as well as the hoses 24, 25, 41, and 42) should be the only equipment components suspended on the load cell 14, whereas the weight of the fluid reservoir 40, inputs and outputs processing device 40, CPU 60, four-way-air valve 70, and pressurized air source 80 should not be suspended by the load cell 14 but by other support means. The inlet 38 and outlet 39 check valves may be attached directly to the pump 12 housing, although they can be situated at any part of the length of the hoses, respectively, shown at 41 and 42. Alternatively, the inlet check valve 38 may also be attached to the fluid reservoir 40, while the outlet check valve 39 may be attached near the receptacle 43 or used in a nozzle (also designated at 43) at the end of the dispensing tubing 42.

Exemplary pump system 10 and process of the invention may involve dispensing of one or more conventional concrete agents (additives or admixtures), including the raw materials used for making such agents.

Conventional concrete admixtures, for example, are often identified in terms of well-known classifications. Thus, exemplary fluids dispensed by the apparatus and process of the invention include concrete admixtures elected from the group consisting of water reducing admixtures (e.g., plasticizers, superplasticizers), rheology modifying admixtures (e.g., slump enhancing agents), set-accelerating admixtures, set retarding admixtures, corrosion inhibiting admixtures (for steel rebar), shrinkage reducing admixtures, fibers (e.g., for reinforcing, for plastic shrinkage crack control), crack control admixtures, pigments, water repellants, air entraining agents, strength enhancing admixtures, curing agents, and others.

The foregoing categories of admixtures can include, for example, molasses, sulfonate, melamine sulfonate formaldehyde polymer, naphthalene sulfonate formaldehyde polymer, calcium chloride, sodium chloride, amines, alkanolamines and their corresponding salts, tall oil, tall oil fatty acid, fatty acids and their derivatives, calcium stearate, zinc stearate, butyl oleate, fatty esters and their derivatives, sodium gluconate, dyes, formic acid, sucrose, sugars, glucose, sodium nitrite, sodium nitrate, calcium nitrite, calcium nitrate, calcium bromide, sodium thiocyanate, corn syrup, sodium sarcosinate, calcium or sodium lignosulfonate, lignin, alcohols, glycols, glycerols, phenols, acetic acid, anhydrous caustic soda, sodium hydroxide, potassium hydroxide, sodium linear alkyl sulfonate, formaldehyde, silica, diglycinate, polymers containing oxyalkylene, calcium formate, formic acid, siloxanes, surfactants, resins and resin acids, rosins and rosin acids, polyacrylic acid, polyacrylic acids having oxyalkylenes, polyvinyl pyrollidone, polyvinyl acetate, polyvinyl alcohol, polysaccharides, carboxylic acids, borax, organic acids and their corresponding salts, carbohydrates, phosphates, phthalates, water-insoluble esters of carbonic and boric acid, silicones, synthetic detergents, salts of sulfonated lignin, salts of petroleum acids, proteinaceous materials, fatty and resinous acids and their salts, alkylbenzene sulfonates, salts of sulfonated hydrocarbons, pozzolans, fly ash, silica fume, blast furnace slag, salts of lithium and barium, rubber, polyvinyl chloride, acrylics, styrene butadiene copolymers, carbon black, iron oxide, phthalocyanate, umber, chromium oxide, titanium oxide, cobalt blue, sodium benzoate, fluoroaluminates, fluorosilicates, vegetable glue, animal glue, saponin, hydroxyethylcellulose, organic flocculents, paraffin emulsion, coal tar, bentonite, silicas, fungicides, germicides, insecticides, and mixtures and derivatives of any of the foregoing.

It is also envisioned that exemplary fluids of the invention can include particulate suspensions, such as slurries containing fume silica, or fiber suspensions, such as taught in U.S. Pat. No. 6,790,275 of Macklin et al., where it was taught that fibers could be metered into concrete as an accurate dosing method (although volumetrically).

Exemplary processes of the invention for dispensing fluids therefore involve providing the above-described air-controlled pump 12 whose weight is substantially at least 100% supported and measured by a load cell 14. Such a process involves directing pressurized air on alternating faces of the second piston 26 so as to slidably move the first piston 16 in reciprocating fashion between filling and expelling positions within the fluid chamber 20 of said first piston sleeve housing 18.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Skilled artisans can make variations and changes without departing from the spirit of the invention.

I claim:

1. A process for dispensing fluids, comprising: providing
   (A) a positive-displacement piston pump apparatus wherein said piston pump apparatus is an air-operated pump comprising first and second pistons each slidably housed within corresponding first and second piston sleeve housings; a shaft member for connecting said pistons; at least one barrier member located between said first and second piston sleeve housings and conformed to permit reciprocating sliding of said shaft member while minimizing air leakage between said first and second piston sleeve housings; said first piston sleeve housing having at least one opening for filling and/or expelling a fluid from said first piston sleeve housing under force of said first piston slidably housed therein; said second piston sleeve housing having a first opening located to admit pressurized air to exert positive force on a first face of said second piston to slidably move said second piston from a first position to a second position within said second piston sleeve housing, said second piston sleeve housing having a second opening located to admit pressurized air operative to exert a positive force on a second face of said second piston to slidably move said second piston from said second position to said first position within said second piston sleeve housing, whereby the positive force of air-pressure is transmitted to said first piston for filling fluid into and dispensing fluid from said first piston sleeve housing; and
   (B) a suspension load cell connected to said air-operated pump wherein said load cell supports and measures substantially at least 100% of the weight of said air-operated pump and the fluid contained in said first piston sleeve housing, said load cell positioned vertically above said air-operated pump and said air-operated pump positioned to hang from said load cell.

2. The process of claim 1 comprising directing pressurized air on alternating faces of said second piston to slidably move said first piston in reciprocating fashion between filling and expelling positions within said first piston sleeve housing, whereby a fluid is contained within said piston sleeve housing and expelled therefrom.

3. A fluid dispensing apparatus, comprising:
   (A) a positive-displacement piston pump apparatus wherein said piston pump apparatus is an air-operated pump comprising first and second pistons each slidably housed within corresponding first and second piston sleeve housings; a shaft member for connecting said pistons; at least one barrier member located between said first and second piston sleeve housings and conformed to permit reciprocating sliding of said shaft member while minimizing air leakage between said first and second piston sleeve housings;

said first piston sleeve housing having at least one opening for filling and/or expelling a fluid from said first piston sleeve housing under force of said first piston slidably housed therein;

said second piston sleeve housing having a first opening located to admit pressurized air to exert positive force on a first face of said second piston to slidably move said second piston from a first position to a second position within said second piston sleeve housing, said second piston sleeve housing having a second opening located to admit pressurized air operative to exert a positive force on a second face of said second piston to slidably move said second piston from said second position to said first position within said second piston sleeve housing, whereby the positive force of air-pressure is transmitted to said first piston for filling fluid into and dispensing fluid from said first piston sleeve housing; and (B) a suspension load cell connected to said air-operated pump wherein said load cell supports and measures substantially at least 100% of the weight of said air-operated pump and the fluid contained in said first piston sleeve housing, said load cell positioned vertically above said air-operated pump and said air-operated pump positioned to hang from said load cell.

4. The fluid dispensing apparatus of claim 3 wherein said first piston sleeve housing comprises a first opening for admitting fluid into said first piston sleeve housing and a second opening for expelling said fluid from said first piston sleeve housing.

5. The fluid dispensing apparatus of claim 4 further comprising an inlet check valve to permit fluid to flow through said first opening into said first piston sleeve housing but to check fluid from flowing out of said housing, and an outlet check valve to permit fluid to flow through said second opening out of said first piston sleeve housing but to check fluid from flowing into said housing.

6. The fluid dispensing apparatus of claim 3 further comprising a frame for mounting said load cell and to suspend said air-operated pump above the ground.

7. The fluid dispensing apparatus of claim 3 further comprising:
a pneumatic valve controller connected to a four-way air valve for alternatively directing pressurized air into, and exhausting air from, said first and second openings of said second piston sleeve housing;
an inputs processing device operative to receive electrical signals emitted by said load cell and to transmit electrical signals to said pneumatic valve controller; and
a computer processing unit for receiving electrical signals from and transmitting electrical signals to said inputs processing device.

8. The fluid dispensing apparatus of claim 7 further comprising an inlet check valve and outlet check valve to admit passage of fluid into or out of said first piston sleeve housing.

9. The fluid dispensing apparatus of claim 8 further comprising a dispensable fluid reservoir from which fluid is filled into said air-operated pump.

10. The fluid dispensing apparatus of claim 7 further comprising a compressed air tank connected to said four-way air valve.

11. The fluid dispensing apparatus of claim 10 wherein said dispensable fluid reservoir contains at least one fluid selected from the group consisting of water reducing admixtures, rheology modifying admixtures, set-accelerating admixtures, set retarding admixtures, corrosion inhibiting admixtures, shrinkage reducing admixtures, fibers, crack control admixtures, pigments, water repellants, air entraining agents, strength enhancing admixtures, and curing agents.

12. The fluid dispensing apparatus of claim 10 wherein said dispensable fluid reservoir contains at least one fluid selected from the group consisting of molasses, sulfonate, melamine sulfonate formaldehyde polymer, naphthalene sulfonate formaldehyde polymer, calcium chloride, sodium chloride, amines, alkanolamines and their corresponding salts, tall oil, tall oil fatty acid, fatty acids and their derivatives, calcium stearate, zinc stearate, butyl oleate, fatty esters and their derivatives, sodium gluconate, dyes, formic acid, sucrose, sugars, glucose, sodium nitrite, sodium nitrate, calcium nitrite, calcium nitrate, calcium bromide, sodium thiocyanate, corn syrup, sodium sarcosinate, calcium or sodium lignosulfonate, lignin, alcohols, glycols, glycerols, phenols, acetic acid, anhydrous caustic soda, sodium hydroxide, potassium hydroxide, sodium linear alkyl sulfonate, formaldehyde, silica, diglycinate, polymers containing oxyalkylene, calcium formate, formic acid, siloxanes, surfactants, resins and resin acids, rosins and rosin acids, polyacrylic acid, polyacrylic acids having oxyalkylenes, polyvinyl pyrollidone, polyvinyl acetate, polyvinyl alcohol, polysaccharides, carboxylic acids, borax, organic acids and their corresponding salts, carbohydrates, phosphates, phthalates, water-insoluble esters of carbonic and boric acid, silicones, synthetic detergents, salts of sulfonated lignin, salts of petroleum acids, proteinaceous materials, fatty and resinous acids and their salts, alkylbenzene sulfonates, salts of sulfonated hydrocarbons, pozzolans, fly ash, silica fume, blast furnace slag, salts of lithium and barium, rubber, polyvinyl chloride, acrylics, styrene butadiene copolymers, carbon black, iron oxide, phthalocyanate, umber, chromium oxide, titanium oxide, cobalt blue, sodium benzoate, fluoroaluminates, fluorosilicates, vegetable glue, animal glue, saponin, hydroxyethylcellulose, organic flocculents, paraffin emulsion, coal tar, bentonite, silicas, fungicides, germicides, insecticides, and mixtures and derivatives of any of the foregoing.

13. The fluid dispensing apparatus of claim 3 wherein, in said first piston sleeve housing having at least one opening for filling and/or expelling a fluid from said housing under force of said first piston slidably housed therein, said first piston has a first face defining a fluid chamber within said first piston sleeve housing and a second face defining an auxiliary air chamber within said first piston sleeve housing, said auxiliary air chamber being vented, sealed, or connected to a source of pressurized air.

* * * * *